United States Patent Office 3,529,702
Patented Sept. 22, 1970

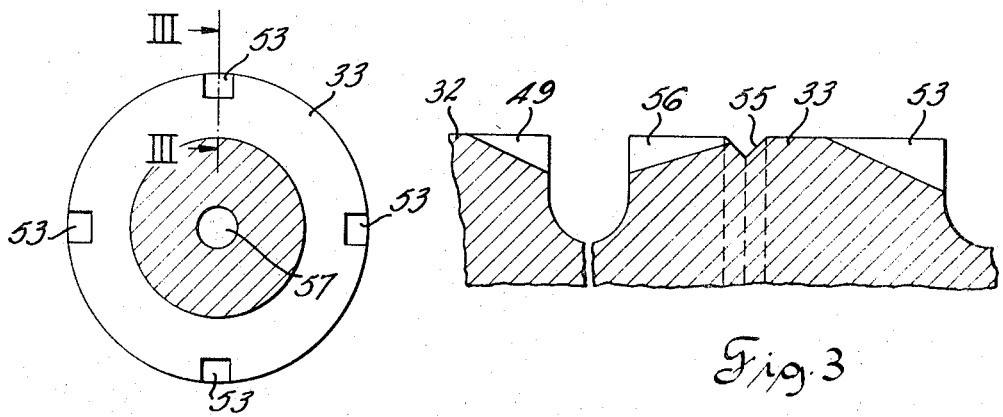
Fig. 2
Fig. 3
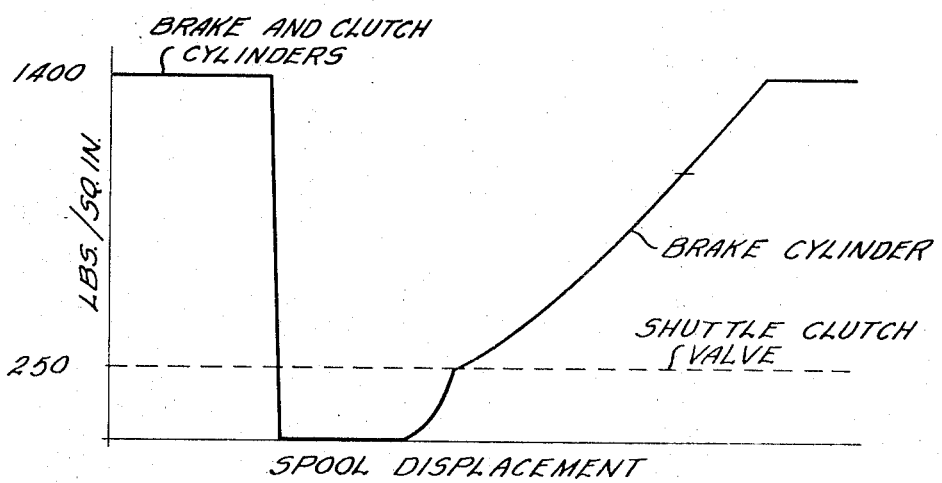
Fig. 4
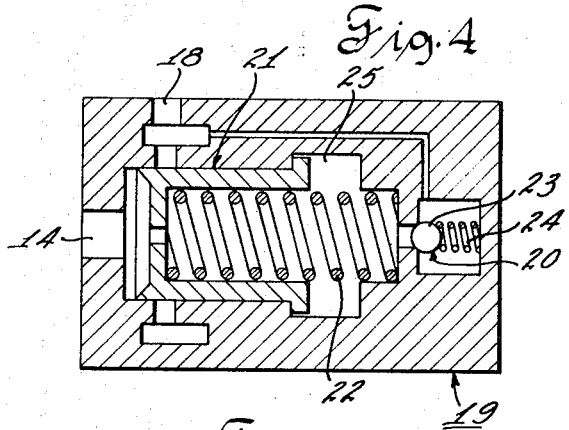
Fig. 5

3,529,702
WINCH CLUTCH AND BRAKE WITH MODULATING SELECTOR VALVE
Richard W. Eckstein, Jr., New Berlin, Wis., assignor to Allis-Chalmers Manufacturing Company, Milwaukee, Wis.
Filed Apr. 29, 1968, Ser. No. 725,054
Int. Cl. F16d 67/04
U.S. Cl. 192—17
6 Claims

ABSTRACT OF THE DISCLOSURE

A hydraulic system including a control valve for actuating a tractor winch brake and clutch. The system includes a source of pressurized fluid capable of providing a variable pressure and a valve to control engagement of a clutch and disengagement of a normally engaged brake, or provide a variable pressure for disengagement of the brake which in turn controls cable tension on the winch drum.

---

This invention relates to a hydraulic system having a signle source of pressurized fluid and more particularly to a valve supplying pressurized fluid for actuating of a winch clutch for reeling cable in while simultaneously providing control of the winch brake, or provide a variable pressure control for disengagement of the brake.

A hydraulically actuated tractor winch includes a winding drug with hydraulic means for engaging the clutch and brake for controlling the winding in of cable or the paying out of cable. The winch herein described employs a normally applied brake and a normally disengaged clutch. When the clutch is engaged to permit taking in cable the brake is released to permit the winding drum to be driven. The brake release is preferably slight after engagement of the clutch in order to prevent reverse rotation of the drum under cable load. It is also customary to provide additional control for releasing the brake without engaging the clutch to permit the cable to pay out, or unwind under load tension.

This invention includes a hydraulic system having a source of pressurized fluid capable of producing a variable pressure. A control valve in communication with the source of pressurized fluid provides a control for engaging the clutch and disengaging a normally actuated brake and thereby the winding of the cable on the drum, or alternately apply a variable pressure to the winch brake to control the degree of torque required to slip the brake and thereby the load on the cable. The valve further includes a means of supplying a substantially constant pressure of pressurized fluid to a fluid actuator for a device such as a shuttle clutch. The system includes means for throttling the fluid as it passes through the valve to provide smooth operation of the fluid actuators.

It is an object of this invention to provide a hydraulic system to control the clutch and brake of a hydraulically actuated winch.

It is another object of this invention to provide a control valve in a hydraulic system for actuating a winch by engaging the winch clutch while disengaging a normally actuated winch brake, or alternatively disengaging the clutch and infinitely varying the hydraulic fluid pressure in the hyraulic brake actuator to thereby control torque required to slip the brake.

It is a further object of this invention to provide a hydraulic system having a variable pressure source of pressurized fluid and a control valve for engaging the clutch while simultaneously disengaging the normally engaged brake for winding the cable on a winch drum, or alternatively disengage the clutch and disengage the brake by infinitely varying the pressure in the hydraulic brake cylinder which opposes the normally engaging brake force.

It is a further object of this invention to provide in a hydraulic system having a variable pressure pump, a valve for engaging and disengaging a brake and clutch of a tractor winch while simultaneously supplying hydraulic fluid to a hydraulic actuator for a shuttle clutch downstream at a substantially constant pressure.

The objects of this invention are accomplished by providing a hydraulic system including a source of pressurized fluid capable of developing a variable pressure. A control valve in communication with the source of pressurized fluid provides a means for controlling the flow of pressurized fluid to a hydraulic cylinder to engage a winch clutch and a hydraulic cylinder to disengage a normally engaged winch brake, and alternatively supply infinitely variable pressure to the hydraulic cylinder for the brake which creates a force in opposition to a normally spring actuated brake, to overcome the spring force and release the brake as desired by the operator. The valve further operates as a source of constant pressure of pressurized fluid for a shuttle clutch or any other hydraulic fluid actuator in the system. A bypass circuit vents fluid from the variable pressure source to provide a substantially constant pressure to the shuttle clutch although the pressure build-up in the valve for releasing the brake or engaging the clutch may be substantially higher or lower than the pressure of the fluid supplied to the shuttle clutch.

Referring to the drawings, the preferred embodiments of this invention are illustrated in the attached illustrations.

FIG. 2 illustrates a cross section taken on line II—II of FIG. 1.

FIG. 3 illustrates a cross section view taken on line III—III of FIG. 2.

FIG. 4 illustrates a graph showing relative pressures in the valve.

FIG. 5 illustrates a modification of a bypass valve including a pilot operated relief valve.

Figure 1:
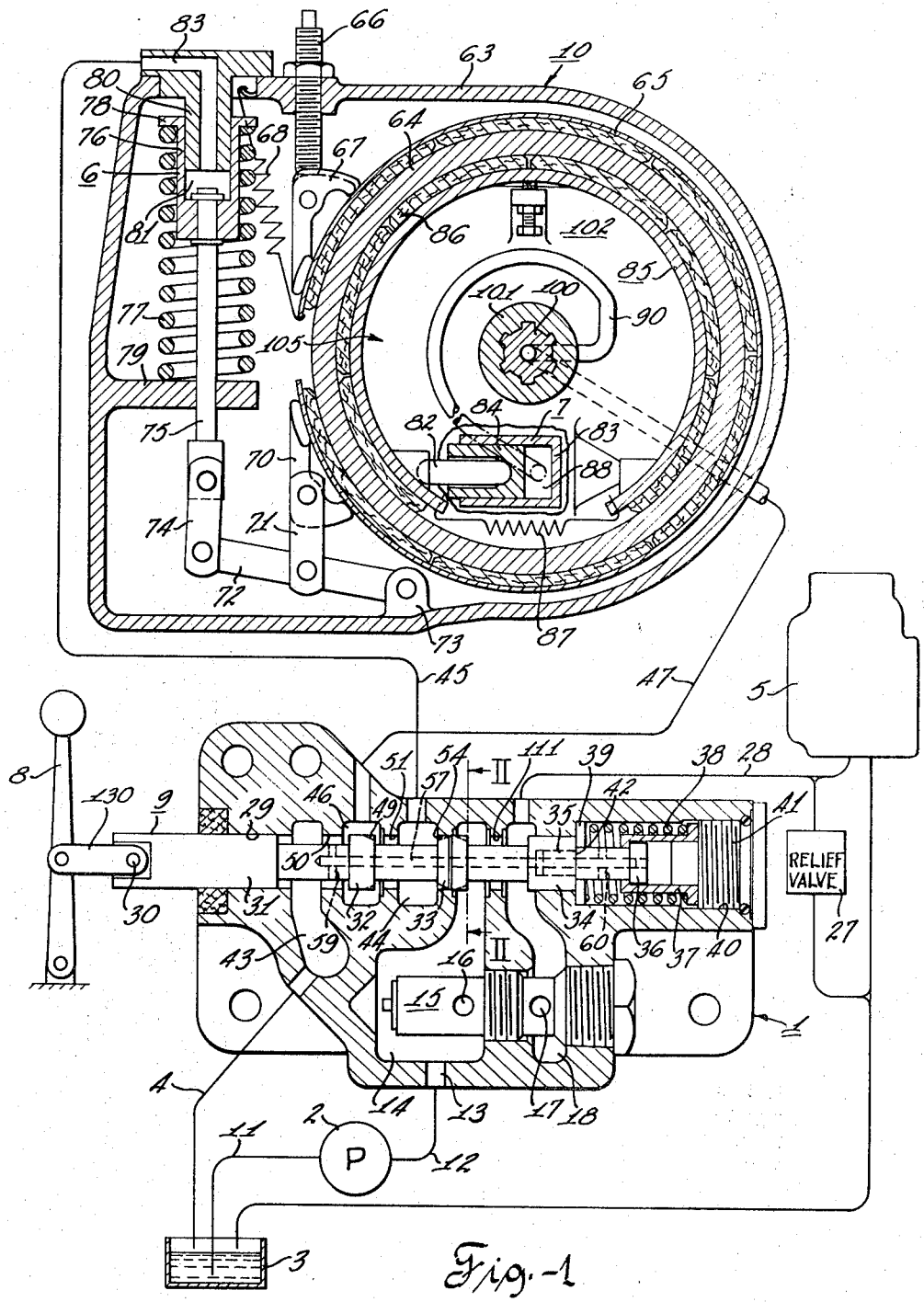
FIG. 1 illustrates a schematic drawing of the hydraulic system including hydraulic means for actuating a winch and a hydraulic device.

Referring to FIG. 1, a control valve is connected to a pump 2 which is capable of developing a variable pressure. The pump is connected to the sump 3 and operated by a suitable source of power.

Valve 1 is also connected by a return conduit 4 to sump 3. The valve 1 also maintains a constant pressure of the pressurized fluid supplied to a shuttle clutch valve 5. The control valve 1 also supplies pressurized fluid to the hydraulic cylinder 6 for controlling the brake as well as the hydraulic cylinder 7 for actuating the clutch. A suitable lever 8 is provided which manually controls the operation of the spool 9 of the valve 1. Although a shuttle clutch valve 5 is illustrated, it is understood that any other hydraulic fluid actuator may be operated from valve 1. The valve 1 provides a means of using a single source of pressurized fluid 2 to supply a plurality of hydraulic actuators such as may be used on a tractor. The valve 1 operates as a means of maintaining the pressure of the fluid supplied to the shuttle clutch valve substantially constant, although the pressure of the source 2 may vary substantially. The source of pressurized fluid varies in response to actuation of the control valve 1 which in turn controls degree of flow and the manner of flow through the valve by throttling due to shifting of the spool 9 to produce the desired pressure on the clutch and the brake actuators in the winch 10.

The low pressure side of the pump 2 is connected by a conduit 11 to the sump 3 for intake of the hydraulic fluid. The high pressure side of the pump 2 is connected by a conduit 12 to the valve 1, by means of passage 13. The chamber 14 is in communication with the passage 13 and receives the end portion of the pressure relief valve 15. The pressure relief valve 15 is essentially a spring biased pressure relief valve. As shown, the port 16 is connected through the valve to the port 17 in the chamber 18.

The valve 19 shown in FIG. 5 is a modification of valve 15 showing a pilot operated relief valve which is initially actuated by the pilot valve 20 due to the differential pressures acting on the ball 23 overcoming the force of spring 24. When valve 20 opens the valve 21 immediately opens due to a greater differential of pressure between chamber 14 and chamber 25 caused by fluid flow through valve 20. The pilot operated relief valve is merely a refinement of the valve 15 which operates at a preset pressure for the purpose of illustration 1150 p.s.i., to allow the flow of pressurized fluid into the chamber 18. The pressure in the chamber 18 is being maintained at a substantially constant pressure limited by relief valve 27 which will be considered for the purpose of illustration to be 250 p.s.i.

The chamber 18 is connected to the conduit 28 to the shuttle clutch valve 5 for operation of a shuttle clutch on a conventional tractor. It is essential that the shuttle clutch valve be operated at about substantially the same pressure regardless of the pressure developed by the source of pressurized fluid in the system. Accordingly, the relief valve 27 will maintain the pressure constant in the chamber 18 which provides a supply of pressurized fluid to operated shuttle clutch valve 5.

The valve 1 also controls the operation of the winch 10. The spool 9 extends axially through a central opening 29 in the valve housing 1. The spool 9 is formed with a pin opening receiving pin 30 in the left-hand end for connection to the lever 8 by a link 130. The spool 9 forms the lands 31, 32, 33 and 34 which slide axially through the central opening 29 as the spool is moved. The right-hand end of the spool defined by the land 34 has a threaded inner portion 35 which threadedly receives the bolt 36. The bolt 36 is seated within a hat-shaped member 37 which is spring biased to the right-hand position as shown by the spring 38 seated on the washer 39.

The right-hand end of the hat-shaped member 37 seats on the plug 41 which threadedly engages the inner periphery of the hole 40 in the housing of valve 1. The washer 39 operates as a seat for the spring 38 which is compressed between the washer 39 and the radial flange on the hat-shaped member 37 which is seated on the plug 41. As the spool 9 is moved to the right-hand direction, the shoulder 42 engages the washer 39 which in turn seats the spring 38 and requires the compression of the spring when the spool moves in a right-hand direction. The biasing force of the spring will tend to maintain the spool 9 in the position as shown. It can be further seen that if the spool 9 is moved in a left-hand direction, the radial flange of the hat-shaped member 37 will cause the compression of the spring 38 which is seated on the washer 39 which will tend to maintain the spool in the position as shown. Accordingly, the spring tends to maintain the spool 9 in its central or neutral position as shown and any movement in either direction will be resisted by compressing of spring 38.

The chamber 43 is connected by the conduit 4 to sump 3. The brake chamber 44 is connected by the conduit 45 to the brake cylinder 6. The clutch chamber 46 is connected by the conduit 47 to the clutch cylinder 7 in the winch 10. The clutch chamber 46, brake chamber 44, and the chamber 18 are connected to chamber 14 sequentially by movement of the spool 9 during operation of the valve 1.

The spool 9 is formed with a plurality of throttling grooves 49 on land 32 as shown in FIGS. 1 and 3 which throttle the fluid as it is transmitted through the central opening 29 between the land 32 and the ridges 50 and 51 defined by the central opening 29. The land 33 on the spool 9 is more clearly shown in FIGS. 2 and 3. FIG. 2 shows a plurality of grooves 53 angularly spaced about the periphery of the land 33. FIG. 3 shows the grooves 53 which provide throttling between the land 33 and the ridges 54 and 111 defined by the central opening 29. An annular recess 55 is also formed on the periphery of the land 33 as well as a plurality of axial slots 56 which provide throttling between the land 33 and the ridge 54 when the spool 9 is moved axially in central opening 29. An axial opening 57 extends centrally through the spool from the radial opening 59 on the left-hand side of the land 32 to the cross opening 60 on screw 36 and the central opening on the right-hand end of the screw 36. The operation of the valve in the system will be subsequently described more clearly setting forth the function of the passages and the grooves in the spool.

The winch 10 includes a housing 63 around the drum 64. A brake band 65 is fastened through the screw 66 and link 67 which engages the upper end of the brake band 65. A retraction spring 68 is also connected to the upper end of the brake band 65.

The lower end of the brake band 65 is connected by a similar link 70 and arm 71 which is in turn pivotally connected to the lever 72. The lever 72 is pivotally supported on a fulcrum 73 and through the connector 74 to the rod 75. The rod 75 engages the spring retainer portion 76 of cylinder 6 which is spring biased to an upward position by the spring 77. The spring 77 is compressed between the retainer flange 78 and the spring seat 79 defined by the housing 63. The spring 77 normally engages the brake band 65 with the drum 64. The piston 80 is received within the spring retainer 76 and forms a chamber 81 which receives pressurized fluid to deactivate the brake. The passage 83 is connected to the conduit 45 to receive the pressurized fluid to deactivate the brake. The brake drum 64 is also formed with a smooth inner periphery for frictionally engaging the clutch facing 86. The clutch band 85 engages the opposite ends of the clutch actuator 7 which includes a cylinder 83 and a piston 84. A strut 82 is positioned intermediate the piston 84 and the clutch band 85. A retraction spring 87 retracts the clutch band 85 when there is no pressurized fluid in chamber 88. The conduit 90 is connected to the conduit 47 to receive pressurized fluid for engaging the clutch.

FIG. 4 illustrates a graph showing pressures which are transmitted to the clutch actuating cylinder and the brake deactivating cylinder. The pressure on the left-hand side of the graph shown in FIG. 4 shows approximately 1400 p.s.i. which is the maximum pressure in chamber 14 when the clutch and brake cylinders are both filled with pressurized fluid. This condition is present when the spool 9 is moved into the left-hand position.

When the spool is moved to the right-hand position, the throttling of the spool in the central opening 29 of the housing of valve 1 will provide a gradually increasing pressure which is transmitted to the brake cylinder only. In this position the clutch cylinder 7 is not in communication with chamber 14 and therefore, the clutch is not engaged. In this position the brake carries the tensile load on the cable wound on the winch drum not shown. The frictional engagement between the brake and the drum 64. is controlled by controlling the degree of pressure of the pressurized fluid in brake cylindrical 6.

The operation of the valve, and the winch clutch and brake will be described in the following paragraphs.

Normally the winch 10 will be in the stationary position with the brake engaged and the clutch disengaged. The shaft 100 is rotating in response to rotation of the transmission of power from the tractor. As the shaft 100 which is splined to the sleeve 101 rotates the rotor 105 consisting essentially of the disc 102, the shaft 100 and the clutch actuator 7 and its connecting means to the clutch band 85. The clutch band 85 has frictional material 86 for engaging the inner periphery of the drum 64 and is supported on a disc 102 concentrically around the axis of the shaft 100. The sleeve 101 and the disc 102 may be integral or connected to each other, however, the two rotate as a unit. The rotor 105 is connected to a winding drum (not shown) which is adapted for winding a cable on a tractor winch.

The drum 64 is normally stationary and maintained in a stationary position by a brake band 65 which is connected to links 67 and 70 by suitable means as previously described. The rod 75 is connected to the spring retainer 76 and spring biased by the spring 77 to cause the brake band to engage the outer periphery of the drum 64. The drum 64 is accordingly locked in a stationary position.

The valve 1 provides a plurality of functions such as controlling the operation of the winch and providing pressurized fluid to the shuttle valve 5. In its normally central position as shown in FIG. 1, the pressurized fluid in the pump 2 enters the chamber 14 and is permitted to pass through the chamber 18 to supply pressurized fluid at approximately 250 p.s.i. to the valve 5. When this condition exists, the valve may be operated by the operator. It is only necessary in this application to point out that the supply of pressurized fluid to the shuttle clutch valve is constant throughout the operation of the valve 1.

The spool 9 is retained in its central position by the spring 38 as previously described. A manual lever 8 is connected to the end of the spool 9 to move the spool axially for operation of the clutch and brake or the brake alone. During the operation of the clutch and brake, or the brake alone, pressure is always maintained at approximately 250 p.s.i. to the shuttle clutch valve.

When the land 33 of the spool 9 moves in the right-hand direction, it begins to open up the central opening as defined by the ridge 54 and throttle a portion of pressurized fluid from the chamber 14 around land 33 to chambers 43 and 44. The grooves 56 on land 33 throttle the flow to sump. The flow to sump continues to decrease as groove 49 on land 32 closes with ridge 51 in the central opening 29. Accordingly, pressure will build up in the chamber 44 as shown by the lower portion of the right-hand side of the curve in FIG. 4. As throttling grooves 49 are closed, the throttling grooves 53 begin to close within the ridge 111 of central opening 29 as shown by the upper portion of the right-hand side of the graph shown in FIG. 4. The pressure in chamber 14 continues to build-up until the pressure reaches approximately 1000 p.s.i. when the pressure in chamber 81 overcomes the force at spring 77 and the brake releases. The pressure continues to build-up as indicated with further movement of spool 9.

During the time spool 9 is moved in the right-hand direction against the biasing force of the spring 38, the land 33 moves from the opening defined by the ridges 54 to opening defined by ridge 111 of the central opening 29. The land 32 also moves within the central opening defined by the ridge 51 closing the brake chamber 44 from sump and allowing the clutch chamber 46 to remain in communication with sump. The throttling grooves 53 in the land 33 throttle the fluid as it passes from the chamber 14 into the chamber 18 gradually building up the pressure in the chambers 14 and 44. With a gradual movement of the spool 9 the degree of throttling is controlled simultaneously which changes the pressure in these two chambers. The pressure in chambers 14 and 44 build up at a rate as indicated on the right-hand side of the graph shown in FIG. 4. In this position the brake can be released when the force created by the pressurized fluid in chamber 81 completely offsets the force of the spring 77. Pressure is maintained in chamber 18 through throttling grooves 53 while relief valve 27 limits this pressure to approximately 250 p.s.i. Eventually the chamber 18 is completely closed off from the chamber 14 and the pressure in chamber 18 is maintained only through the pressure relief valve 15. Pressure relief valve 15 operates at approximately 1150 p.s.i. By the use of pressure control in chamber 44 a load on the end of the cable may be supported or gradually lowered to draw cable out from the winch drum in accordance with the load carried by the cable. The degree of throttling through the grooves 53 controls the pressure in the chambers 14 and 44 in response to movement of the spool 9 within a central opening 29.

The operation of both the winch and the clutch will now be described. As the lever 8 is moved to the left, the spool 9 is also carried to the left, and the land 32 is received within the opening formed by ridge 50 closing off the sump chamber 43 from the clutch chamber 46 and brake chamber 44. When the spool 9 continues to move in the left-hand direction, the land 34 continues to move left until communication is closed between chamber 14 and chamber 18. The pressure, however, in chambers 44 and 46 do not build up until the land 33 on the spool 9 moves beyond ridge 54 in the housing of valve 1 to provide communication between chamber 14 and chambers 44 and 46. At this point, the pressure builds up rapidly within chambers 44 and 46 causing the clutch to engage as pressurized fluid in the chamber 88 builds-up and the brake to disengage as pressurized fluid in the chamber 81 builds up. The build-up of pressure in chambers 88 and 81 will cause clutch engagement and disengagement of the brake. In this position the winch is in operation and the drum 64 will rotate with the rotor 105 providing winding in of the cable on the winch drum (not shown).

When the rotation of the winch drum is stopped, the reverse movement by the spool 9 is made by the operator of the lever 8. The spool is then returned to the neutral position as shown in FIG. 1 and the chambers 44 and 46 are vented to the sump chamber 43. In this position the friction drum 64 is again held in a stationary position by the brake which is actuated by the spring 77.

It can be seen from the above description that the valves 1, 15 and 27 provide the relatively constant source of pressurized fluid to supply the shuttle clutch valve regardless of the pressure produced by the variable pressure pump 2. Simultaneously with supplying substantially constant pressure to the shuttle clutch valve, the valve 1 also provides a means for controlling the brake and the degree of frictional engagement of the brake on the friction drum 64. In this manner, a load can be carried on the cable such as a weight suspended on the end of the cable in the air and can gradually be released or let down to a lower level. This is important that a graduated pressure increase or decrease can be maintained on the brake because if the release was sudden, injury may result from the falling of an object. It is also necessary to sometimes retain a certain degree of tension on a cable to prevent the winch drum from rotating too rapidly and causing the cable to snarl on the winch drum which is inconvenient and may cause breaking of the cable if it rewinds unevenly on the drum.

The preferred embodiments of this invention have been illustrated and described and will be defined by the attached claims.

The embodiments of the invention in which an exclusive property or privilege is claimed are defined as follows:

1. A hydraulic control valve for a winch controlling the flow of pressurized fluid in a hydraulic fluid system including a source of pressurized fluid capable of generating a variable pressure subject to the flow rate through said valve, a winch clutch including a fluid actuator for actuating said winch clutch, a winch brake including a fluid actuator for inactivating a normally actuated winch brake when the actuator is supplied with the fluid pressure, and a sump, said control valve comprising a housing defining a plurality of passages with each passage in communication with one of said fluid actuator of said winch clutch, said fluid actuator of said winch brake, said sump, and said source of pressurized fluid, a valve element including a plurality of cylindrical lands, said lands defining a plurality of axial grooves extending axially a portion of the axial length of said lands and angularly spaced about the periphery of said lands, said valve element selectively and alternatively providing communication between said source of pressurized fluid and said passages connected to said clutch actuator and said brake actuator for engaging said clutch while disengaging said brake, and said grooved lands of said valve element throttling fluid between said source and said brake actuator and said sump to provide an infinitely variable pressure of the pressurized fluid supplied to said brake actuator while said clutch is disengaged to thereby vary the torque load carried by the winch in response to the degree of pressurization of fluid supplied to the actuator for said brake.

2. A control valve as set forth in claim 1 wherein said valve housing defines another passage for connection to another fluid actuator, means defining bypass passage means including a pressure relief valve connected between said source of pressurized fluid and said other fluid actuator to supply pressurized fluid of substantially constant pressure to said other actuator regardless of the pressure supplied to said clutch actuator and said brake actuator.

3. A control valve as set forth in claim 2 wherein a land on said valve element severs communication between the source of pressurized fluid and the clutch actuator to disengage said clutch and provides communication between said source of pressurized fluid and said brake actuator and said grooved lands provides throttling of the pressurized fluid passing from said source of pressurized fluid directly to said sump initially and subsequently provides throttling through said relief valve and to infinitely vary pressure of fluid applied to the brake actuator and thereby varying the torque required to slip the brake.

4. A control valve as set forth in claim 2 wherein a land on said valve element permits direct communication between the source of pressurized fluid and the other fluid actuator initially and subsequently directs flow through said bypass passage means including the pressure relief valve to thereby maintain a substantially constant pressure supplied to the other fluid actuator.

5. A control valve as set forth in claim 2 wherein said valve element includes lands providing communication between the source of pressurized fluid and the winch clutch actuator and the winch brake actuator and direct communication is severed between the source of pressurized fluid and the other fluid actuator to limit fluid flow to said other fluid actuator through a bypass pressure relief valve to thereby provide rapid pressure increase of the pressurized fluid supplied to the clutch actuator and the brake actuator from said source of pressurized fluid and to provide quick response of the winch to the control valve.

6. A hydraulic control valve as set forth in claim 2 wherein said means defining a bypass passage means includes a pilot operated relief valve and another relief valve is positioned in series between the source and the sump to provide a substantially constant pressure of pressurized fluid from said valve for connection to said other fluid actuator when direct communication is severed by said valve element between the source of pressurized fluid and said other fluid actuator.

References Cited

UNITED STATES PATENTS

| | | | |
|---|---|---|---|
| 3,349,879 | 10/1967 | Stuart et al. | 192—18.1 |
| 1,298,956 | 4/1919 | Johnson | 192—17.1 |
| 2,506,842 | 5/1950 | Rockwell | 192—17.1 |
| 2,513,812 | 7/1950 | McClay | 192—17.1 XR |
| 3,128,861 | 4/1964 | Trondsen | 192—17.1 |

FOREIGN PATENTS 663,608   5/1963   Canada.

BENJAMIN W. WYCHE III, Primary Examiner

U.S. Cl. X.R.

192—109, 87.13; 137—625.3, 625.69; 254—187